US012530841B2

(12) United States Patent
Singh

(10) Patent No.: US 12,530,841 B2
(45) Date of Patent: Jan. 20, 2026

(54) INTELLIGENT METHOD TO DYNAMICALLY PRIORITIZE AND ORCHESTRATE SPATIAL COMPUTING DATA FEEDS LEVERAGING QUANTUM GENERATIVE ARTIFICIAL INTELLIGENCE

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 282 days.

(21) Appl. No.: 18/383,610

(22) Filed: Oct. 25, 2023

(65) Prior Publication Data

US 2025/0139880 A1    May 1, 2025

(51) Int. Cl.
*G06T 17/00*    (2006.01)
(52) U.S. Cl.
CPC .................................. *G06T 17/00* (2013.01)
(58) Field of Classification Search
None
See application file for complete search history.

(56) References Cited

U.S. PATENT DOCUMENTS

| 10,701,318 | B2 | 6/2020 | Valli |
| 11,069,143 | B2 | 7/2021 | Kim et al. |
| 11,126,632 | B2 | 9/2021 | Pal et al. |
| 11,315,326 | B2 | 4/2022 | Xu et al. |
| 2023/0237752 | A1* | 7/2023 | Elhadad .................. G06T 11/00 345/419 |

OTHER PUBLICATIONS

Parveau et al. "Toward a user-centric classification scheme for extended reality paradigms," Journal of Ambient Intelligence and Humanized Computing, Jun. 2020, 14 pages.
Pereira et al., "Extended Reality Framework for Remote Collaborative Interactions in Virtual Environments," DOI: 10.1109/ICGI47575.2019.8955025, Nov. 2019, 9 pages.
Andrade et al., "Extended Reality in IoT scenarios: Concepts, Applications and Future Trends," DOI: 10.1109/EXPAT.2019.8876559, Jun. 2019, 7 pages.

* cited by examiner

*Primary Examiner* — Peter Hoang
(74) *Attorney, Agent, or Firm* — Banner & Witcoff, Ltd.

(57) ABSTRACT

Aspects of the disclosure relate to using machine learning models to automatically prioritize and orchestrate spatial data. A computing system may generate, based on inputting scene data and spatial positioning data into a machine learning model, a prioritized context that indicates physical objects that are significant within a physical environment. The scene data may comprise images of the physical environment and the spatial positioning data may comprise an indication of states of a user in the physical environment. Based on the prioritized context meeting user criteria, generate indications associated with the prioritized context. Based on the scene data, one or more spatial anchors at which to position the one or more indications of the prioritized context within a virtual environment based on the physical environment may be generated. The virtual environment comprising the indications of the prioritized context positioned at the one or more spatial anchors may be generated.

20 Claims, 7 Drawing Sheets

INTELLIGENT METHOD TO DYNAMICALLY PRIORITIZE AND ORCHESTRATE SPATIAL COMPUTING DATA FEEDS LEVERAGING QUANTUM GENERATIVE ARTIFICIAL INTELLIGENCE

TECHNICAL FIELD

Some aspects of the disclosure relate to using quantum computing devices to implement machine learning models that may be configured to automatically prioritize and orchestrate data from a spatial computing device. In particular, some aspects of the disclosure pertain to more efficiently processing the output from sensors of a spatial computing device.

BACKGROUND

Augmented reality computing may be used to create a virtual environment that may be superimposed on a rendering of the physical environment in which a user may be present. This virtual environment may provide a user with a more convenient way of performing tasks such as navigation and searching for information, that may have otherwise been implemented on other devices such as smart phones or laptop computers. Further, the immersive nature of augmented reality may allow for different types of user interfaces and interaction modalities that may not be practical with other types of devices. Further, the virtual environment may receive large amounts of data that includes images, sounds, and other sensor data that may be processed by the augmented reality device.

However, processing vast amounts of sensor data and user input data in real time may require significant amounts of computational resources. Additionally, inefficient processing of such data may result in latency and other issues that may disrupt the user experience or exceed the capabilities of the computing device that does the processing. As a result, attempting to improve the processing of such data may present challenges.

SUMMARY

Aspects of the disclosure provide technical solutions to improve the effectiveness with which spatial computing data may be prioritized and/or orchestrated.

In accordance with one or more embodiments of the disclosure, a quantum computing system for generating and orchestrating spatial data, the computing system may comprise a spatial computing device configured to generate a virtual environment based on one or more sensors that generate scene data based on one or more states of a physical environment. The scene data may comprise one or more images of the physical environment. The computing system may generate spatial positioning data may comprise an indication of one or more states of a user in the physical environment. The computing system may comprise a quantum computing device configured to implement one or more machine learning models that recognize physical objects within the physical environment and generates a plurality of candidate contexts that indicate different sets of the physical objects that are significant within the physical environment. The computing system may comprise one or more processors. The computing system may comprise memory storing computer-readable instructions that, when executed by the one or more processors, cause the computing system to generate, based on inputting the scene data and the spatial positioning data into the one or more machine learning models, a prioritized context of the plurality of candidate contexts. The computing system may determine whether a prioritized context of the plurality of candidate contexts meets one or more user criteria. The computing system may, based on the prioritized context meeting the one or more user criteria, generate one or more indications associated with the prioritized context. The computing system may generate, based on the scene data, one or more spatial anchors at which to position the one or more indications of the prioritized context within the virtual environment based on the physical environment. The computing system may generate the virtual environment may comprise the one or more indications of the prioritized context positioned at the one or more spatial anchors.

In one or more implementations, the quantum computing device may comprise a plurality of quantum gates and may be configured to generate quantum bits (qubits) based on highly entangled photons. The quantum computing device may be further configured to generate the plurality of candidate contexts based on passing the qubits through the plurality of quantum gates and detecting output of the plurality of quantum gates.

In one or more implementations, the memory stores additional computer-readable instructions to generate the prioritized context of the plurality of candidate contexts, that when executed by the one or more processors, further cause the computing system to: generate a plurality of priority values based on the different sets of the physical objects within the physical environment; and determine that the prioritized context may be the candidate context corresponding to the priority value that is highest.

In one or more implementations, the scene data and/or spatial positioning data may be homomorphically encrypted. Further, the computing system may be configured to process the spatial positioning data that has been homomorphically encrypted.

In one or more implementations, the spatial positioning data may comprise geo-coordinates that indicate a geographic location of the spatial computing device. Further, the one or more locations of the one or more spatial anchors are based on the geo-coordinates.

In one or more implementations, the one or more indications of the prioritized context comprise at least one virtual object that may be anchored to at least one of the physical objects.

In one or more implementations, the prioritized context may comprise a navigational context. Further, the one or more indications may comprise an indication of a current location or one or more directional indications to a location within the physical environment.

In one or more implementations, the prioritized context may comprise an informational context. Further, the one or more indications may comprise a description of at least one of the physical objects that was recognized.

In one or more implementations, the prioritized context may comprise a personal context. Further, the one or more indications may comprise one or more virtual objects that were configured by a user of the spatial computing device. Further, the one or more virtual objects may comprise a virtual desktop, a virtual office, and/or a virtual user interface.

In one or more implementations, the memory stores additional computer-readable instructions to determine whether a prioritized context of the plurality of candidate contexts meets one or more user criteria, that when executed by the one or more processors, further cause the computing system to: determine an amount of computational resources that are required to generate the one or more indications; and based on the amount of computational resources exceeding a resource threshold, determine that the prioritized context meets the one or more user criteria.

In one or more implementations, the memory stores additional computer-readable instructions to determine whether a prioritized context of the plurality of candidate contexts meets one or more user criteria, that when executed by the one or more processors, further cause the computing system to: determine whether the prioritized context meets one or more privacy criteria; and based on the prioritized context meeting the one or more privacy criteria, determine that the prioritized context meets the one or more user criteria.

In one or more implementations, the meeting the one or more privacy criteria may comprise the prioritized context not indicating confidential information with respect to the physical objects in the physical environment. Further, the confidential information may comprise confidential financial information, confidential health information, or confidential employment information.

In one or more implementations, the memory stores additional computer-readable instructions that, when executed by the one or more processors, further cause the computing system to: access context training data may comprise historical scene data and historical spatial positioning data; generate, based on inputting the context training data into the one or more machine learning models, a plurality of training contexts; determine a similarity between the plurality of training contexts and a plurality of ground-truth contexts; generate, based on the similarity between the plurality of training contexts and the plurality of ground-truth contexts, a context prediction accuracy of the one or more machine learning models; and modify a weighting of a plurality of context parameters of the one or more machine learning models based on the context prediction accuracy. The weighting of the plurality of context parameters that increase the context accuracy may be increased. Further, the weighting of the plurality of context parameters that decrease the context accuracy may be decreased.

In one or more implementations, the scene data may comprise audio based on sounds detected in the environment by the one or more sensors.

In one or more implementations, the spatial positioning data may indicate a direction in which a user of the spatial computing device may be looking and/or a body position of the user.

Corresponding methods (e.g., computer-implemented methods), apparatuses, devices, systems, and/or computer-readable media (e.g., non-transitory computer readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
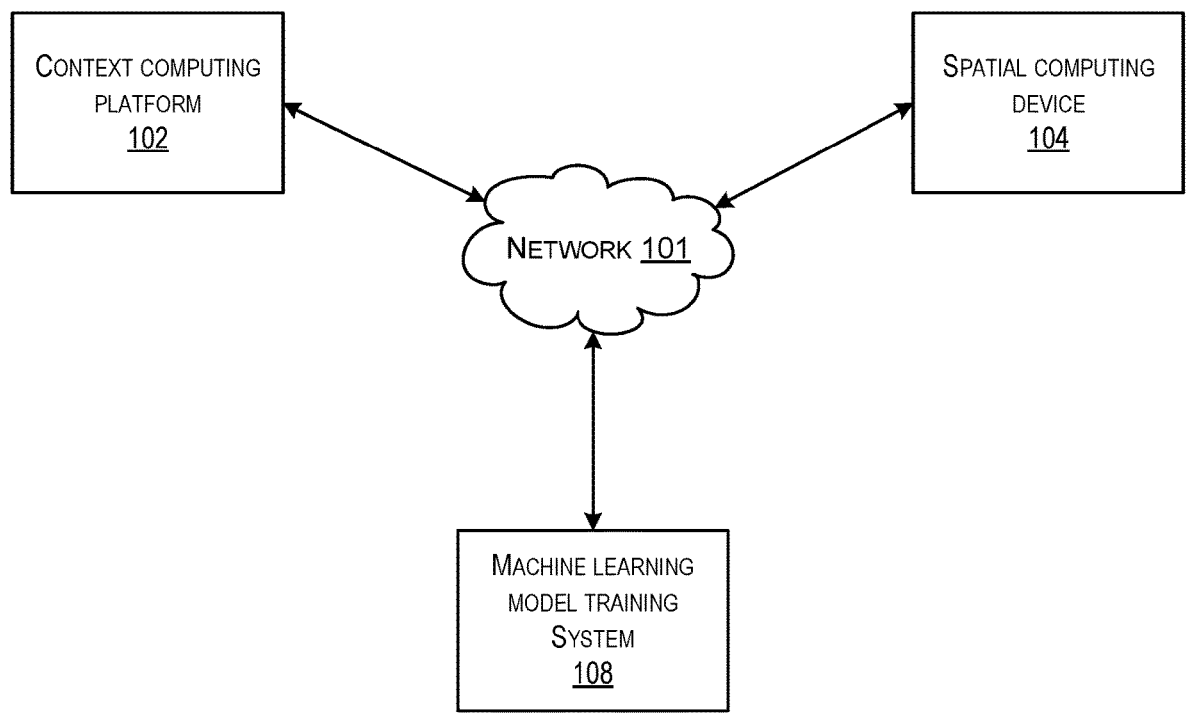
FIG. 1 depicts an illustrative computing environment for spatial data prioritization and orchestration in accordance with one or more aspects of the disclosure.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosed technology may relate to devices, systems, non-transitory computer readable media, and/or methods for dynamically processing (e.g., prioritizing and/or orchestrating) data to generate an applicable context for a spatial computing device. For example, a spatial computing device may comprise an extended reality device, a virtual reality device, an augmented reality device, and/or a mixed reality device. In particular, the disclosed technology may leverage the use of artificial intelligence (e.g., machine learning models) to analyze data that indicates the state of an environment and/or a state of a user in relation to the environment (e.g., positioning data) and determine an applicable context for a spatial computing environment (e.g., a combination of virtual reality, augmented reality, and/or mixed reality). The disclosed technology may be implemented on a quantum computing device that may rapidly generate large numbers of candidate contexts from which an applicable context (e.g., highest priority context and/or optimal context) may be determined or selected. The use of these techniques may result in a variety of benefits and advantages including an improvement in spatial computing context generation and more effective use of resources to process a spatial computing environment.

Generating a spatial computing environment may comprise generating virtual object that may be superimposed over a representation of a physical environment in which a user is present. For example, a spatial computing device may receive a video feed that comprises images of an environment surrounding the spatial computing device. The spatial computing device may use positioning data to determine the position of the spatial computing device to determine the portion of the surrounding environment to include in the images of the environment that are generated. For example, a head-mounted spatial computing device may use image data from cameras and/or positioning data from various sensors to generate video that is sent to display devices mounted in front of a user's eyes. The video sent to the display devices may give a user the impression that the user is looking at the environment in front of the viewer. In another embodiment, a virtual object may be rendered on a translucent surface through which a user may view the virtual object and the surrounding physical environment through the translucent surface. By displaying the virtual object on the translucent surface, the virtual object may appear as if the object is part of the physical environment. Based on the context in which the spatial computing device is present, various virtual objects and/or indications that are applicable to the context may be generated.

The context may be based on the evaluation of various parameters (e.g., context determination parameters) including a geographic location of the spatial computing device (e.g., workplace office, living room at home, and/or a restaurant), user motion (e.g., gestures), object recognition of objects in a physical environment, environmental conditions (e.g., light, heat, humidity, and/or air pressure), sounds in an environment, time of day (e.g., morning or evening), the time of year (e.g., winter or summer), a user's position (e.g., sitting or standing), and/or eye tracking and gaze detection. For example, in an environment comprising a bus stop, a spatial computing device may determine that the context includes a bus stop context and generate virtual objects that comprise a bus schedule or estimated arrival time for the next bus. In another environment, such as in front of a bank, the spatial computing device may determine that the context includes a banking context and generate virtual objects indicating a closing time of the bank and/or an indication of the location of another bank that is open if the bank nearest the user is closed.

In some circumstances, the context that is most applicable may be based on the identity of a user of the spatial computing device. For example, in a physical environment in which a bus stop is in front of a bank, the appropriate context for a car driving user may be a banking context in which banking related virtual objects are generated. In the case of a bus riding user that uses a different bank from the bank in the physical environment around the user, a bus stop context may be appropriate. Aside from the identity of a user, the applicable context may be determined based on user preferences which may be used in the determination of the applicable context for an environment. Additionally, parameters used to determine the applicable context may be based on security preferences, privacy preferences, urgency preferences, availability of computational resources, complexity, and/or the performance of available computational resources.

Further, there may be multiple contexts within a physical environment and prioritization of the contexts and determination of an applicable context (e.g. a highest priority context) may be used to generate the applicable virtual objects and/or indications.

To more effectively determine an applicable context the disclosed technology may provide an artificial intelligence (e.g., machine learning model) algorithm based computing platform that may be implemented on a quantum computing device (e.g., a quantum photonic computing device). Use of a quantum computing device that is uniquely configured to process positioning data and sensor data based on the state of a physical environment may result in more rapid generation of candidate contexts and the determination of an applicable context for the particular physical environment. For example, a computing system (e.g., a context computing platform) may comprise a spatial computing device (e.g., a head-mounted spatial computing device) that is configured to generate a spatial computing environment based on one or more sensors (e.g., cameras and/or microphones) that detect on one or more states of a physical environment. For example, the spatial data generated by the spatial computing device may comprise images, video, and/or audio detected in a physical environment. The spatial computing device may also be configured to generate spatial positioning data comprising an indication of one or more states (e.g., head position, hand position, geographic location, and/or eye gaze direction) of a user and/or the spatial computing device in the physical environment.

Further, the computing system may comprise a quantum computing device configured to implement one or more machine learning models (e.g., a neural network and/or generative artificial intelligence model) that may perform operations comprising recognizing objects within the physical environment and generating a plurality of candidate contexts that may be prioritized and from which an applicable context may be selected for use by a spatial computing device. For example, the quantum computing device may comprise a plurality of quantum gates that are configured to implement one or more machine learning models and generate highly entangled quantum states based on input comprising a plurality of quantum bits (qubits) corresponding to data based on the state of a physical environment (e.g., audio-visual data), a position of the device, and/or user preferences. Further, the quantum computing device may be configured to generate a plurality of candidate contexts based on the highly entangled quantum states. For example, determination of the highest priority context may be based on processing various context determination parameters that may be weighted and may include recognized objects in the physical environment, the position of the device, and/or user preferences. Further, a plurality of confidence values corresponding to the plurality of candidate contexts may be generated and the candidate context corresponding to the highest confidence value may be determined to be most applicable context for a particular combination of physical environment, the position of the device, and/or user preferences.

A highest priority context of the plurality of candidate contexts may be determined to be the applicable context for the physical environment and may be used in the generation of the spatial computing environment. For example, the applicable context may be used to generate context data which may comprise indications (e.g., virtual objects, audio, haptic vibrations, and/or text) that may be used by the spatial computing device. By way of further example, the applicable context may be used to anchor virtual objects within a virtual representation of a physical environment. For example, if the prioritized context is associated with an office context, a virtual object (e.g., a virtual calendar) may be anchored to the top of an office desk that the user of the spatial computing device uses.

FIG. 1 depicts an illustrative computing environment for spatial data prioritization and orchestration in accordance with one or more aspects of the disclosure. Referring to FIG. 1, computing environment 100 may include one or more computing systems. For example, computing environment 100 may include context computing platform 102, spatial computing device 104, quantum computing device 106, and/or a machine learning model training system 108.

As described further below, context computing platform 102 may comprise a computing system that includes one or more computing devices (e.g., computing devices comprising one or more processors, one or more memory devices, one or more storage devices, and/or communication interfaces) that may be used to analyze scene data indicating the state of a physical environment and spatial positioning data indicating the state of a user in the physical environment. For example, the context computing platform 102 may be configured to implement one or more machine learning models that may be configured and/or trained to retrieve scene data, retrieve spatial positioning data, generate a prioritized context of a plurality of candidate contexts, determine whether the prioritized context meets one or more user criteria, generate one or more indications, generate one or more spatial anchors, and/or generate a virtual environment.

In some implementations, the context computing platform 102 may transmit data (e.g., a request to access scene data and/or spatial positioning data) that may be used to access information (e.g., scene data and/or spatial positioning data) associated with the spatial computing device 104, and/or machine learning model training system 108. The data transmitted by the context computing platform 102 may be transmitted to spatial computing device 104 and/or machine learning model training system 108. Spatial computing device 104 may be configured to grant access to the context computing platform 102. For example, authorization to access the scene data and/or spatial positioning data generated by spatial computing device 104 may be restricted to authorized users of the context computing platform 102 and/or the spatial computing device 104 (e.g., an authenticated user of the spatial computing device 104).

In some implementations, context computing platform 102 may comprise quantum computing components that may be used to generate qubits, process input comprising the qubits, and generate output comprising a plurality of candidate contexts comprising a prioritized context. In particular, context computing platform 102 may comprise one or more processing devices and/or one or more storage devices as described herein.

Communication between the context computing platform 102, spatial computing device 104, and/or machine learning model training system 108 may be encrypted. In some embodiments, the context computing platform 102 may access one or more computing devices and/or computing systems remotely. For example, the context computing platform 102 may remotely access the spatial computing device 104, and/or the machine learning model training system 108.

Spatial computing device 104 may comprise one or more computing devices and/or one or more computing systems on which scene data and/or spatial positioning data may be generated and/or processed. Spatial computing device 104 may comprise one or more extended reality devices, one or more virtual reality devices, one or more augmented reality devices, one or more mixed reality devices, and/or one or more controllers (e.g., controllers that may be configured to receive user input and generate one or more virtual outputs that may be detected in a virtual environment). The one or more user inputs may be based on one or more physical inputs of a user (e.g., a user's hand gesture may cause a virtual input within a virtual environment). Further, the spatial computing device may be configured to display a virtual environment via one or more display devices of the spatial computing device (e.g., one or more monitors mounted in a spatial computing headset, one or more projectors that may project images onto a surface, and/or one or more of a user's retinas).

The spatial computing device 104 may comprise one or more sensors and may be configured to generate scene data based on one or more states of a physical environment in which the spatial computing device 104 is present. For example, the spatial computing device 104 may comprise one or more cameras that may capture one or more images of the physical environment surrounding the spatial computing device 104. Further, the spatial computing device 104 may comprise one or more microphones that may capture sounds in the environment surrounding the spatial computing device 104. The spatial computing device 104 may generate scene data comprising audio based on the sounds that were detected.

Further, the spatial computing device 104 may comprise one or more sensors that may be configured to generate spatial positioning data based on one or more states of a user (e.g., a user of the spatial computing device 104). For example, the spatial computing device 104 may comprise one or more cameras, LiDAR, and/or sonar that may track movements of a user including eye movements (e.g., eye tracking), gestures, facial expressions, a user's foot movement and/or position, a user's body position including limb positions, hand movements (e.g., pointing, clicking, and/or selecting virtual objects in a virtual environment), and/or head movements (e.g., nodding or turning) by the user. Further, the spatial computing device 104 may be configured to output a virtual environment in which one or more virtual images may be superimposed over one or more images of an actual physical environment captured by one or more sensors of the spatial computing device 104.

Further, the spatial computing device 104 may comprise one or more audio output devices that may generate sounds associated with a virtual environment. For example, the spatial computing device 104 may generate clicking sounds or chiming sounds when a user interactions with the virtual environment are detected. In some implementations, the spatial computing device 104 may comprise a smartphone, a tablet, and/or a laptop computing device. Further, a virtual environment may be generated via a display device of the spatial computing device 104. Further, one or more virtual inputs may be conveyed via one or more input devices (e.g., a keyboard or touchscreen) of the spatial computing device.

The spatial computing device 104 may be located at a different physical location than the context computing platform 102 and/or the machine learning model training system 108. Although a single instance of the spatial computing device 104 is shown, this is for illustrative purposes only, and any number of spatial computing device 104 may be included in the computing environment 100 without departing from the scope of the disclosure.

Each of the one or more computing devices and/or one or more computing systems described herein may comprise one or more processors, one or more memory devices, one or more storage devices (e.g., one or more solid state drives (SSDs), one or more hard disk drives (HDDs), and/or one or more hybrid drives that incorporate SSDs, HDDs, and/or RAM), and/or a communication interface that may be used to send and/or receive data and/or perform operations including determining whether to grant access scene data and/or spatial positioning data generated by the spatial computing device 104. For example, the context computing platform 102 may receive, from the spatial computing device 104 a request to process scene data and/or spatial positioning that may be used to generate a plurality of candidate contexts comprising a prioritized context.

Machine learning model training system 108 may comprise a computing system that includes one or more computing devices (e.g., servers, server blades, and/or the like) and/or other computer components (e.g., one or more processors, one or more memory devices, and/or one or more communication interfaces) that may be used to store training data that may be used to train one or more machine learning models. For example, the machine learning model training system 108 may store training data comprising one or more training instructions for the generation of a plurality of candidate contexts and a prioritized context. One or more machine learning models stored and/or trained on the machine learning model training system 108 may include the one or more machine learning models on the context computing platform 102. Further, the one or more machine learning models of the context computing platform 102 may be trained and/or updated by the machine learning model training system 108.

Computing environment 100 may include one or more networks, which may interconnect the context computing platform 102, spatial computing device 104, and/or machine learning model training system 108. For example, computing environment 100 may include a network 101 which may interconnect, e.g., context computing platform 102, spatial computing device 104, and/or machine learning model training system 108. In some instances, the network 101 may be a 5G data network, and/or other data network.

In one or more arrangements, context computing platform 102, spatial computing device 104, and/or machine learning model training system 108 may comprise one or more computing devices capable of sending and/or receiving data (e.g., scene data and/or spatial positioning data) and processing the data accordingly. For example, context computing platform 102, spatial computing device 104, machine learning model training system 108 and/or the other systems included in computing environment 100 may, in some instances, include server computers, desktop computers, laptop computers, tablet computers, smart phones, or the like that may include one or more processors, one or more memory devices, communication interfaces, one or more storage devices, and/or other components.

Further, any combination of context computing platform 102, spatial computing device 104, and/or machine learning model training system 108 may, in some instances, be special-purpose computing devices configured to perform specific functions. For example, context computing platform 102 may comprise one or more application specific integrated circuits (ASICs) that are configured to process scene data, spatial positioning data, implement one or more machine learning models, and/or generate a prioritized context of a plurality of candidate contexts.

Figure 2:
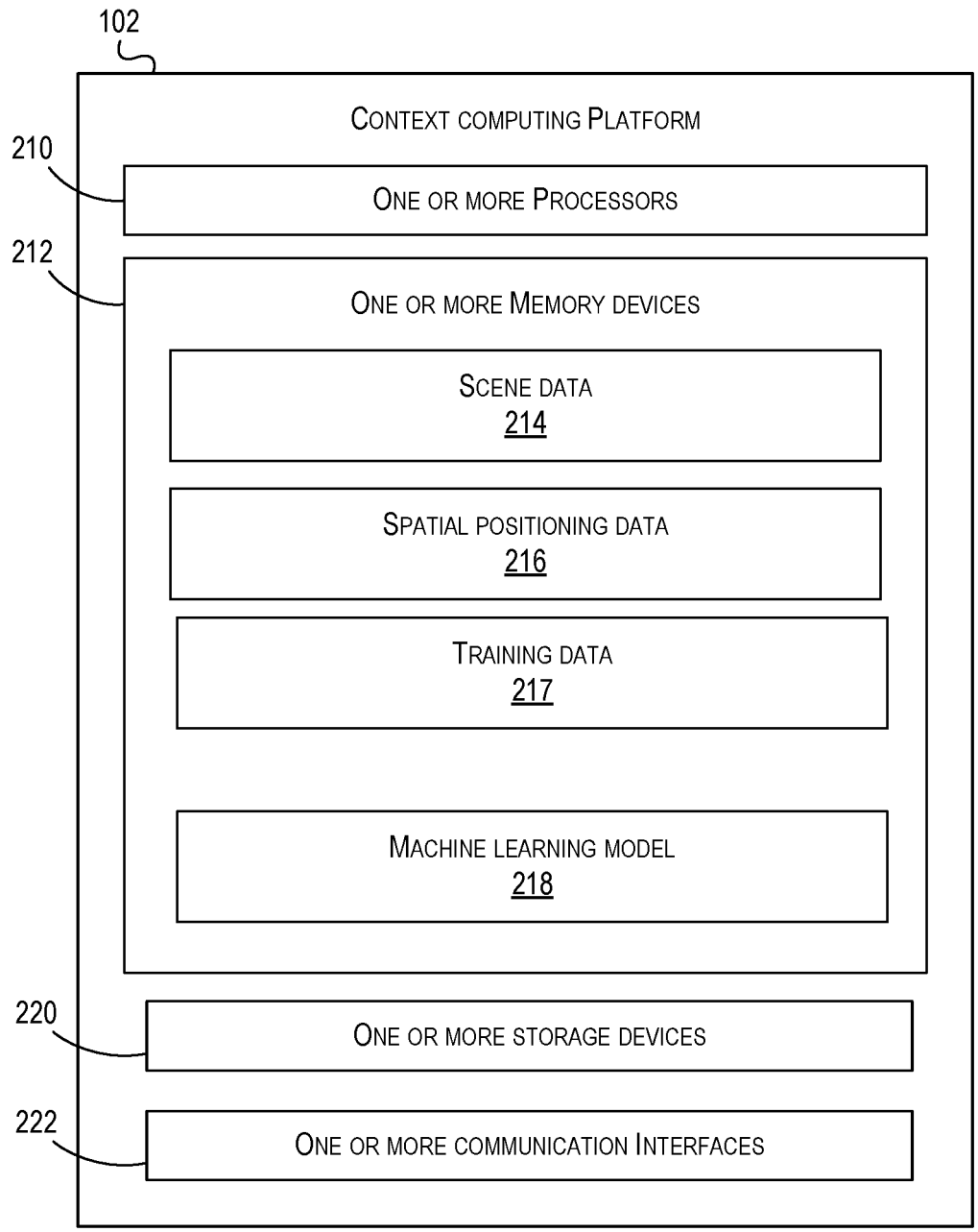
FIG. 2 depicts an illustrative computing system for spatial data prioritization and orchestration in accordance with one or more aspects of the disclosure.

FIG. 2 depicts an illustrative computing system for spatial data prioritization and orchestration in accordance with one or more aspects of the disclosure. Context computing platform 102 may include one or more processors (e.g., processor 210), one or more memory devices 212, and a communication interface (e.g., one or more communication interfaces 222). A data bus may interconnect the processor 210, one or more memory devices 212, one or more storage devices 220, and/or one or more communication interfaces 222. One or more communication interfaces 222 may be configured to support communication between context computing platform 102 and one or more networks (e.g., network 101, or the like). One or more communication interfaces 222 may be communicatively coupled to the one or more processor 210. The memory may include one or more program modules having instructions that when executed by one or more processor 210 may cause the context computing platform 102 to perform one or more functions described herein and/or access data that may store and/or otherwise maintain information which may be used by such program modules and/or one or more processors 210.

The one or more memory devices 212 may comprise RAM. In some instances, the one or more program modules and/or databases may be stored by and/or maintained in different memory units of context computing platform 102 and/or by different computing devices that may form and/or otherwise make up context computing platform 102. For example, the memory may have, host, store, and/or include scene data 214, spatial positioning data 216, training data 217, and/or one or more machine learning models 218. One or more storage devices 220 (e.g., solid state drives and/or hard disk drives) may also be used to store data including the scene data 214. The one or more storage devices 220 may comprise non-transitory computer readable media that may store data when the one or more storage devices 220 are in an active state (e.g., powered on) or an inactive state (e.g., sleeping or powered off).

Scene data 214 may comprise data that indicates the state of a physical environment. The scene data 214 may comprise one or more images (e.g., two-dimensional images and/or three-dimensional images), one or more audio recordings, geo-coordinates, one or more thermal measurements, and/or one or more barometric pressure measurements. The scene data 214 may be used to select a prioritized context from a plurality of candidate contexts.

Spatial positioning data 216 may comprise data that one or more states of a user in the physical environment. The spatial positioning data 216 may indicate a geographic location of a user; a direction in which a user is looking; whether a user is sitting or standing; and/or a position of a user's limbs, head, feet, and/or hands. The spatial positioning data 216 may be used to select a prioritized context from a plurality of candidate contexts.

Training data 217 may comprise historical scene data and/or historical spatial positioning data. Training data 217 may be used to train one or more machine learning models (e.g., machine learning models 218). Further, training data 217 may be modified (e.g., some historical data may be added, deleted, and/or changed) over time. For example, new scene data and/or new spatial positioning data may be used to update the training data 217. Further, the training data may be periodically updated after new contexts are generated.

One or more machine learning models 218 may implement, refine, train, maintain, and/or otherwise host an artificial intelligence model that may be used to process, analyze, evaluate, and/or generate data. For example, the one or more machine learning models 218 may process, analyze, and/or evaluate scene data 214 and/or spatial positioning data 216. Further, the one or more machine learning models 218 may generate output including a determination of a prioritized context that may be selected from a plurality of candidate contexts based on spatial positioning data. For example, a prioritized context may comprise a candidate context with a highest priority value. Further, one or more machine learning models 218 may comprise one or more instructions that direct and/or cause the context computing platform 102 to access the scene data 214, access the spatial positioning data 216, generate a prioritized context, and/or perform other functions.

Figure 3:
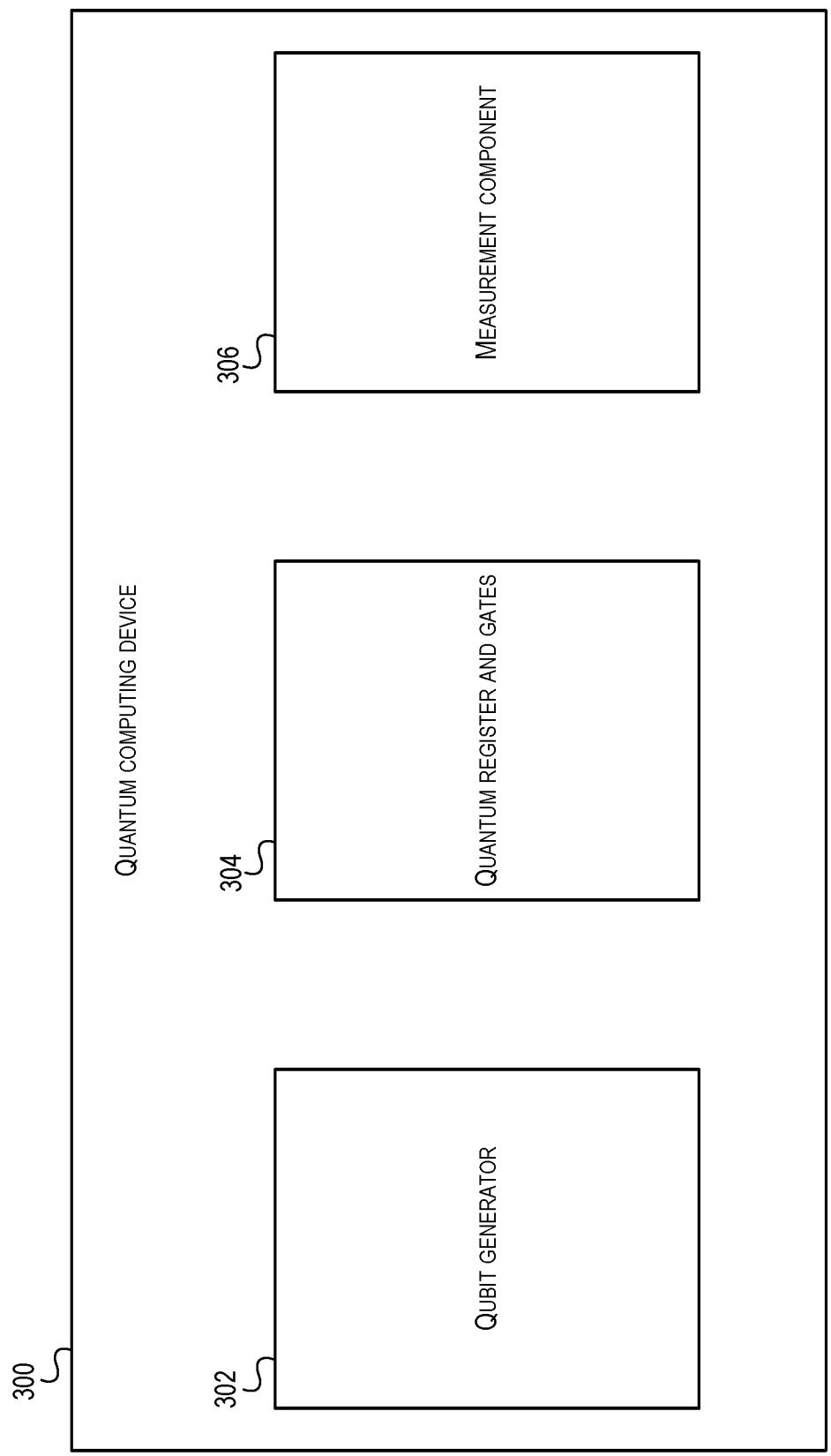
FIG. 3 depicts an illustrative quantum computing device for automated spatial data prioritization and orchestration in accordance with one or more aspects of the disclosure.

FIG. 3 depicts an illustrative quantum computing device for automated generation and orchestration of spatial data in accordance with one or more aspects of the disclosure. Quantum computing device 300 may be part of context computing platform 102 which may include the features and/or capabilities of quantum computing device 300. Quantum computing device 300 may comprise one or more processors, one or more memory devices, and a communication interface (not shown). A data bus may interconnect the processor, one or more memory devices, one or more storage devices, and/or one or more communication interfaces (not shown). One or more communication interfaces may be configured to support communication between quantum computing device 300 and one or more other devices (e.g., context computing platform 102) and/or one or more networks (e.g., network 101, or the like). One or more communication interfaces (not shown) may be communicatively coupled to the one or more processor. The memory may include one or more program modules having instructions that when executed by one or more processor may cause the quantum computing device 300 to perform one or more functions described herein and/or access data that may store and/or otherwise maintain information which may be used by such program modules and/or one or more processors. The one or more memory devices may comprise RAM. In some instances, the one or more program modules and/or databases may be stored by and/or maintained in different memory units of quantum computing device 300 and/or by different computing devices that may form and/or otherwise make up quantum computing device 300.

Quantum computing device 300 may comprise a qubit generator 302 that may be configured to generate a plurality of qubits. The qubits may be generated using superconducting circuits (e.g., Josephson junctions), nuclear magnetic resonance on molecules in a liquid state, and/or photonics. For example, an array of laser devices may be used to generate photons that are directed through the qubit generator 302. A quantum squeezing component of the qubit generator 302 may generate qubits based on generating squeezed superposition states of the photons. Quantum squeezing of the qubits may improve the detectability of the qubits by interferometers used in the quantum register and gates 304. The qubits may be sent to the quantum register and gates 304.

The quantum register and gates 304 may comprise an interferometer that may comprise beam splitters and/or phase shifters that may direct the photons to quantum registers and quantum gates. The quantum registers may be configured to store states of the qubits and the quantum gates may be configured to perform operations (e.g., generating the plurality of candidate contexts). Further, the quantum gates of the quantum register and gates 304 may comprise quantum logic gates that may be used to perform operations. For example, the quantum logic gates may comprise identify gates, Pauli gates, phase shift gates, swap gates, Toffoli gates, Hadamard gates, and/or controlled gates. The quantum register and gates 304 may be configured based on input from the context computing platform 102. For example, the quantum register and gates 304 may be configured to implement one or more machine learning models that is configured to generate the plurality of candidate contexts based on scene data and/or spatial positioning data as described herein. Further, the arrangement of quantum gates in the quantum register and gates 304 may be based on the arrangement of gates in the one or more machine learning models implemented on a non-quantum computing device. The quantum register and gates 304 may generate output comprising highly entangled photons that may be received by measurement component 306.

Measurement component 306 may comprise photon detectors and may be configured to count the highly entangled photons outputted by the quantum register and gates 304. The measurement component 306 may be comprise a transition edge sensor that may be used to detect the highly entangled photons. Further, the measurement component 306 may be configured to analyze the highly entangled photons and generate an output that may be sent to the context computing platform 102. For example, the measurement component may analyze the highly entangled photons and use an integer array to generate a plurality of candidate contexts comprising a prioritized context that may meet one or more user criteria (e.g., one or more computational resource criteria and/or one or more privacy criteria).

Figure 4:
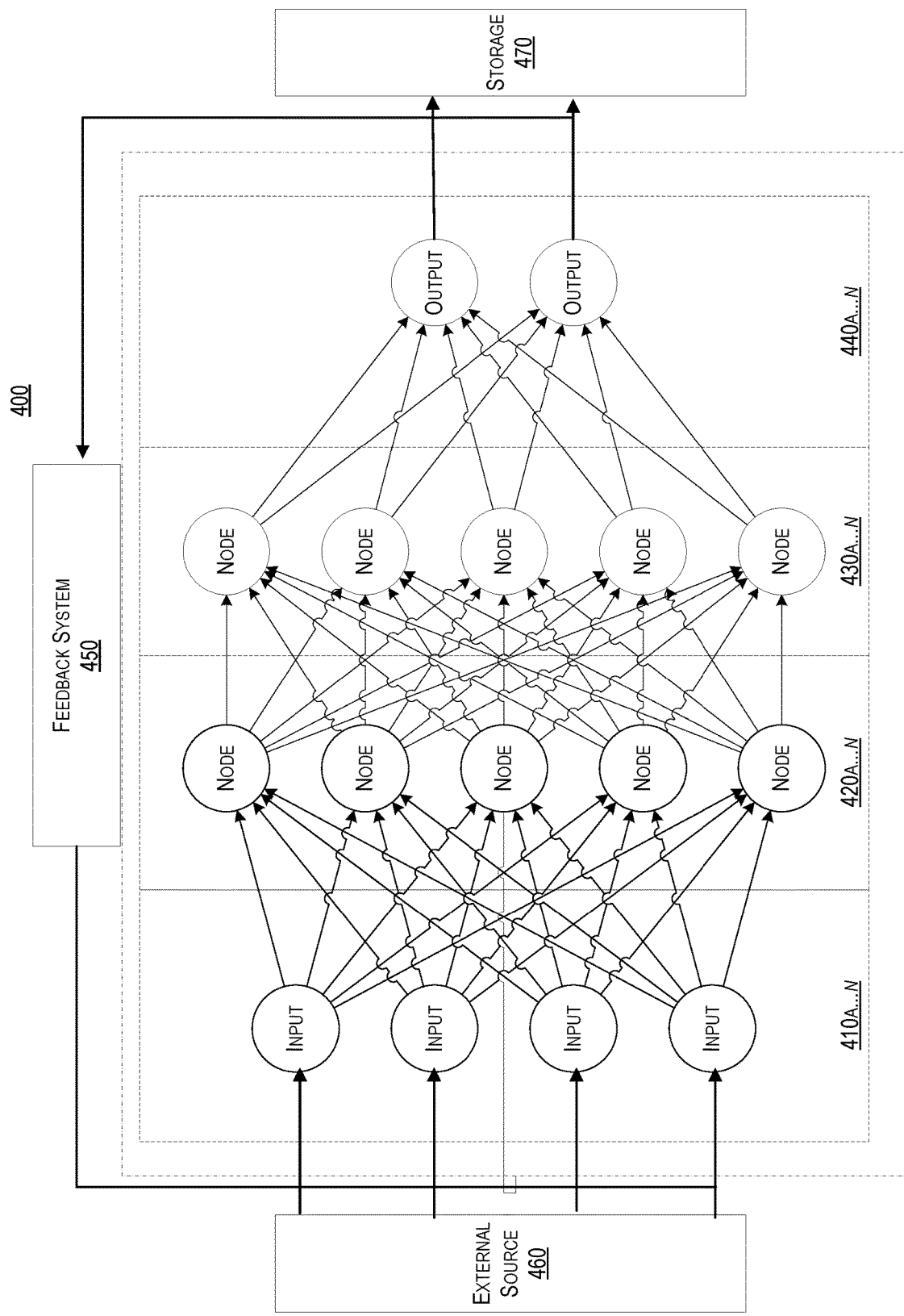
FIG. 4 depicts nodes of an illustrative artificial neural network on which a machine learning algorithm may be implemented in accordance with one or more aspects of the disclosure.

FIG. 4 depicts nodes of an illustrative artificial neural network on which a machine learning algorithm may be implemented in accordance with one or more aspects of the disclosure. In FIG. 4, each of input nodes 410*a-n* may be connected to a first set of processing nodes 420*a-n*. Each of the first set of processing nodes 420*a-n* may be connected to each of a second set of processing nodes 430*a-n*. Each of the second set of processing nodes 430*a-n* may be connected to each of output nodes 440*a-n*. Though only two sets of processing nodes are shown, any number of processing nodes may be implemented. Similarly, though only four input nodes, five processing nodes, and two output nodes per set are shown in FIG. 4, any number of nodes may be implemented per set. Data flows in FIG. 4 are depicted from left to right: data may be input into an input node, may flow through one or more processing nodes, and may be output by an output node. Input into the input nodes 410*a-n* may originate from an external source 460. Output may be sent to a feedback system 450 and/or to storage 470. The feedback system 450 may send output to the input nodes 410*a-n* for successive processing iterations with the same or different input data.

In one illustrative method using feedback system 450, the system may use machine learning to determine an output. The output may include regression output, confidence values, and/or classification output. For example, the output may include a plurality of candidate contexts comprising a prioritized context that meets one or more user criteria. The system may use any machine learning model including one or more generative adversarial networks (one or more machine learning models), XGBoosted decision trees, autoencoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization may comprise minimizing the number of false positives to maximize the generation of prioritized contexts that meet one or more user criteria. Alternatively, an optimization function may minimize the number of missed positives to optimize minimization of losses.

In one example, FIG. 4 depicts nodes that may perform various types of processing, such as discrete computations, computer programs, and/or mathematical functions implemented by a computing device. For example, the input nodes 410$a$-$n$ may comprise logical inputs of different data sources, such as one or more data servers. The processing nodes 420$a$-$n$ may comprise parallel processes executing on multiple servers in a data center. And, the output nodes 440$a$-$n$ may be the logical outputs that ultimately are stored in results data stores, such as the same or different data servers as for the input nodes 410$a$-$n$. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 400 may learn and/or be dynamically reconfigured. Though nodes are depicted as having connections only to successive nodes in FIG. 4, connections may be formed between any nodes. For example, one processing node may be configured to send output to a previous processing node.

Input received in the input nodes 410$a$-$n$ may be processed through processing nodes, such as the first set of processing nodes 420$a$-$n$ and the second set of processing nodes 430$a$-$n$. The processing may result in output in output nodes 440$a$-$n$. As depicted by the connections from the first set of processing nodes 420$a$-$n$ and the second set of processing nodes 430$a$-$n$, processing may comprise multiple steps or sequences. For example, the first set of processing nodes 420$a$-$n$ may be a rough data filter, whereas the second set of processing nodes 430$a$-$n$ may be a more detailed data filter.

The artificial neural network 400 may be configured to effectuate decision-making. As a simplified example for the purposes of explanation, the artificial neural network 400 may be configured to generate data (e.g., a prioritized context of a plurality of candidate contexts) and/or instructions (e.g., instructions to generate the prioritized context of the plurality of candidate contexts). The input nodes 410$a$-$n$ may be provided with scene data and/or spatial positioning data. The first set of processing nodes 420$a$-$n$ may be each configured to perform specific steps to analyze the scene data and/or spatial positioning data. The second set of processing nodes 430$a$-$n$ may be each configured to generate a prioritized context of a plurality of candidate contexts. Multiple subsequent sets may further refine this processing, each looking for further more specific tasks, with each node performing some form of processing which need not necessarily operate in the furtherance of that task. The artificial neural network 400 may then execute or cause to be executed operations that generate a plurality of candidate contexts comprising a prioritized context that may have a highest priority value and/or meet one or more user criteria.

The feedback system 450 may be configured to determine the accuracy of the artificial neural network 400. Feedback may comprise an indication of similarity between the value of an output generated by the artificial neural network 400 and a ground-truth value. For example, in the prioritized context generation example provided above, the feedback system 450 may be configured to determine the contexts that has a highest priority value and/or meet one or more user criteria and may include the selection of a prioritized context that optimally meets the one or more user criteria when compared to the other generated contexts.

The feedback system 450 may already have access to the ground-truth data (e.g., a prioritized context that has a highest priority value and/or meets the one or more user criteria), such that the feedback system may train the artificial neural network 400 by indicating the accuracy of the output generated by the artificial neural network 400. The feedback system 450 may comprise human input, such as an administrator indicating to the artificial neural network 400 whether it made a correct decision. The feedback system may provide feedback (e.g., an indication of whether the previous output was correct or incorrect and/or an extent to which the generated contexts are similar to the ground-truth contexts) to the artificial neural network 400 via input nodes 410$a$-$n$ or may transmit such information to one or more nodes. The feedback system 450 may additionally or alternatively be coupled to the storage 470 such that output is stored. The feedback system may not have correct answers at all, but instead base feedback on further processing: for example, the feedback system may comprise a system programmed to analyze and/or validate context data, such that the feedback allows the artificial neural network 400 to compare its results to that of a manually programmed system.

The artificial neural network 400 may be dynamically modified to learn and provide better input. Based on, for example, previous input and output and feedback from the feedback system 450, the artificial neural network 400 may modify itself. For example, processing in nodes may change and/or connections may be weighted differently. Additionally or alternatively, the node may be reconfigured to process scene data and/or spatial positioning data differently. The modifications may be predictions and/or guesses by the artificial neural network 400, such that the artificial neural network 400 may vary its nodes and connections to test hypotheses.

The artificial neural network 400 need not have a set number of processing nodes or number of sets of processing nodes, but may increase or decrease its complexity. For example, the artificial neural network 400 may determine that one or more processing nodes are unnecessary or should be repurposed, and either discard or reconfigure the processing nodes on that basis. As another example, the artificial neural network 400 may determine that further processing of all or part of the input is required and add additional processing nodes and/or sets of processing nodes on that basis.

The feedback provided by the feedback system 450 may be mere reinforcement (e.g., providing an indication that output is correct or incorrect, awarding the machine learning algorithm a number of points, or the like) or may be specific (e.g., providing the correct output). The artificial neural network 400 may be supported or replaced by other forms of machine learning. For example, one or more of the nodes of artificial neural network 400 may implement a decision tree, associational rule set, logic programming, regression model, cluster analysis mechanisms, Bayesian network, propositional formulae, generative models, and/or other algorithms or forms of decision-making. The artificial neural network 400 may effectuate deep learning. In some implementations, the artificial neural network 400 may receive input including one or more input features. The one or more input features may comprise information associated with a number and/or type of candidate contexts.

Figure 5:
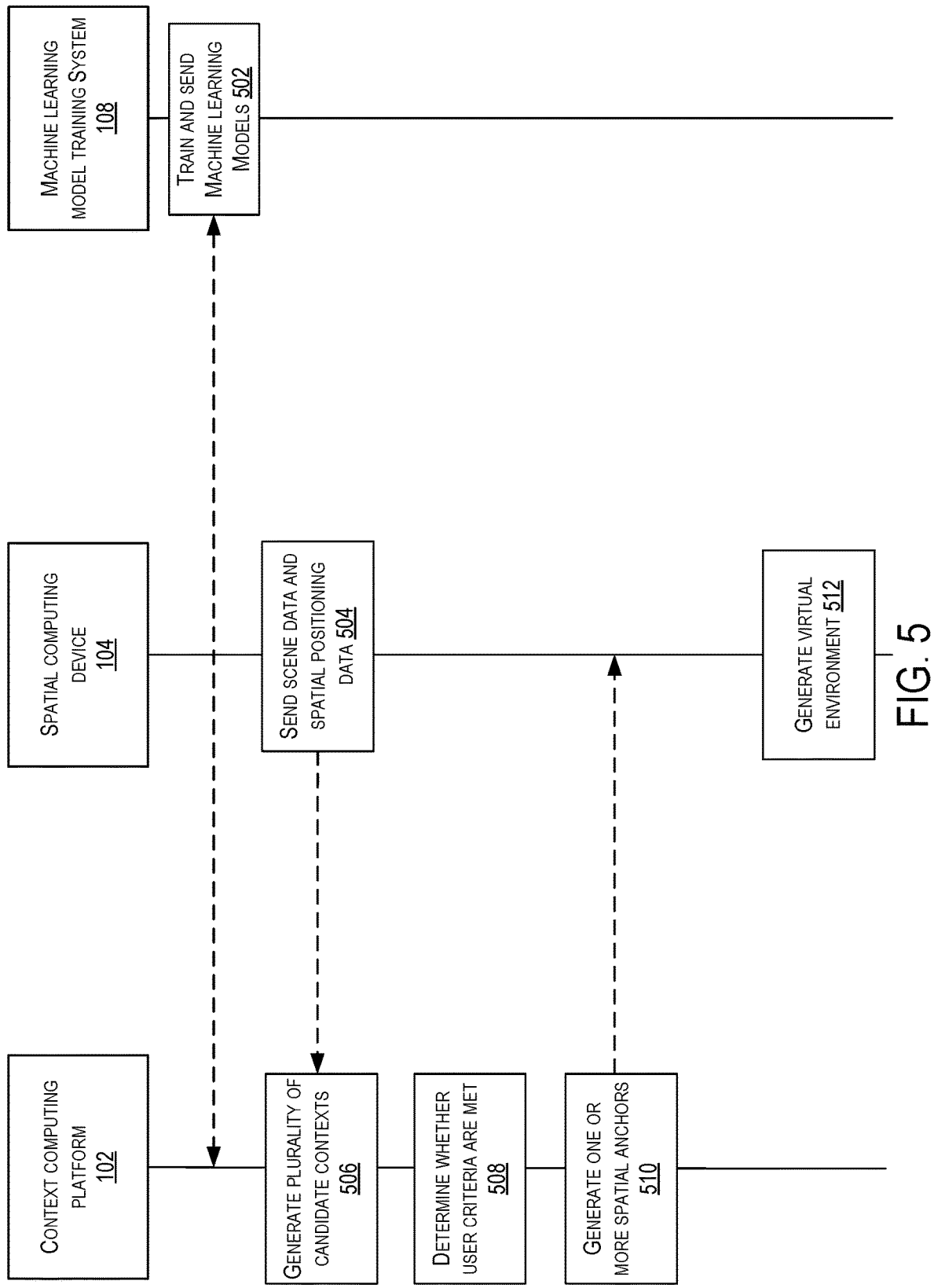
FIG. 5 depicts an illustrative event sequence for spatial data prioritization and orchestration in accordance with one or more aspects of the disclosure.

FIG. 5 depicts an illustrative event sequence for spatial data prioritization and orchestration in accordance with one or more aspects of the disclosure. Referring to FIG. 5, at step 502, a machine learning model training system 108 may train one or more machine learning models to generate, based on input comprising training data (e.g., historical scene data and/or historical spatial positioning data) into the one or more machine learning models, a plurality of training contexts comprising a prioritized context that meets one or more user criteria. The machine learning model training system may then send the one or more trained machine learning models to context computing platform 102 which may implement the one or more trained machine learning models.

In some embodiments, context computing platform 102 may periodically establish a data connection with the machine learning model training system 108 in order to receive up to date copies of one or more machine learning models (e.g., the one or more machine learning models 218 described with respect to FIG. 2 and/or the artificial neural network 400 that is described with respect to FIG. 4) that may be used to generate a prioritized context of a plurality of candidate contexts as described herein. In some instances, the machine learning model training system 108 may determine whether the context computing platform 102 has an updated copy of the one or more machine learning models and may send an indication to the context computing platform 102 if an update is not warranted at that time.

At step 504, the context computing platform 102 may generate a plurality of candidate contexts, one of which may be a prioritized context. The prioritized context and/or the plurality of candidate contexts may be based on inputting scene data and/or spatial positioning data into the one or more trained machine learning models sent to the context computing platform 102 in step 502. As described herein, the scene data may comprise one or more images, one or more audio recordings, a thermal measurement, geo-coordinates, and/or a pressure measurement. Further, the spatial positioning data may indicate a position of a user in a physical environment.

At step 508, the context computing platform 102 may determine whether one or more user criteria have been met. For example, the context computing platform 102 may determine whether sufficient computational resources are available to generate one or more indications of the prioritized context.

At step 512, the context computing platform 102 may, based on the one or more user criteria being met, generate one or more spatial anchors at which to position one or more indications within a virtual environment. The one or more spatial anchors may comprise geo-coordinates that may be used to anchor one or more indications comprising virtual objects within the virtual environment that may be based on the physical environment that was detected by the spatial computing device 104.

At step 514, the context computing platform 102 may generate a virtual environment comprising the one or more indications located at the locations of the one or more spatial anchors. For example, the virtual environment may comprise one or more indications that are superimposed over images of a physical environment. The one or more indications may comprise one or more virtual objects (e.g., virtual text and/or shapes) that highlight physical objects that are determined to be significant within the physical environment.

Figure 6:
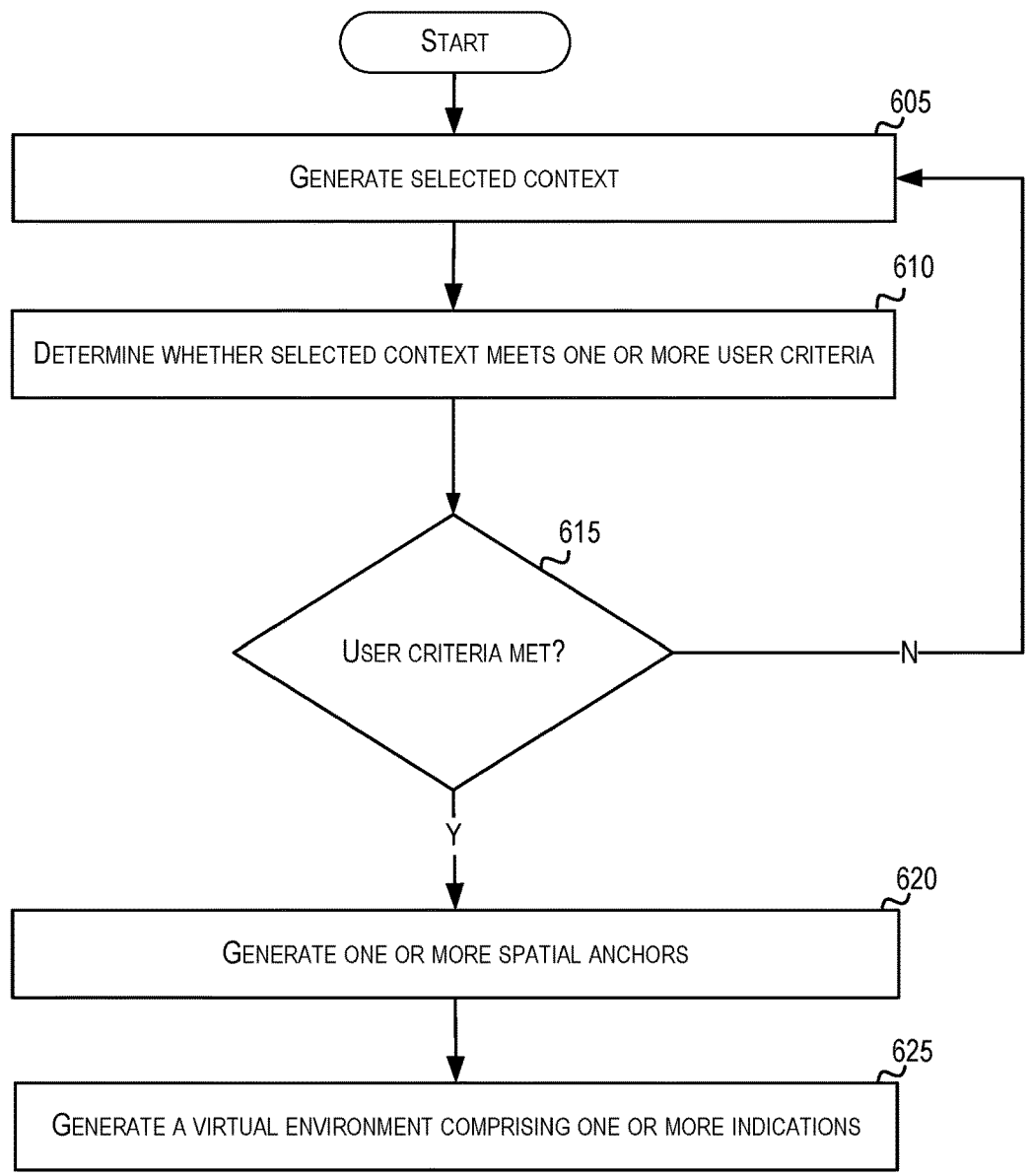
FIG. 6 depicts an illustrative method for automatically prioritizing and orchestrating spatial data in accordance with one or more aspects of the disclosure.

FIG. 6 depicts an illustrative method for automatically prioritizing and orchestrating spatial data in accordance with one or more aspects of the disclosure. The steps of a method 600 for automatically prioritizing and orchestrating spatial data may be implemented by a computing device or computing system (e.g., the context computing platform 102) in accordance with the computing devices and/or computing systems described herein. One or more of the steps described with respect to FIG. 6 may be omitted, performed in a different order, and/or modified. Further, one or more other steps (e.g., the steps described with respect to FIG. 7) may be added to the steps described with respect to FIG. 6.

At step 605, a computing system may generate, a prioritized context. Generating the prioritized context may be based on inputting scene data and/or spatial positioning data into one or more machine learning models that are configured and/or trained to generate a prioritized context. The scene data and/or the spatial positioning data may be received and/or retrieved from a spatial computing device (e.g., spatial computing device 104) that is configured to generate and/or send the scene data and/or the spatial positioning data. A prioritized context may comprise a candidate context that is selected from a plurality of candidate contexts that are generated by the one or more machine learning models. For example, the prioritized context may be selected from the plurality of candidate contexts that have been evaluated according to the suitability of each candidate context to a current physical environment and/or user body position. For example, the context computing platform 102 may input the scene data and/or the spatial positioning data into one or more machine learning models 218, which may be configured and/or trained to generate the plurality of candidate contexts.

Generating the prioritized context may comprise generating a plurality of priority values based on the different sets of the physical objects within the physical environment. Further, generating the prioritized context may comprise determining that the prioritized context is the candidate context corresponding to the priority value that is highest. For example, generating the plurality of candidate contexts may comprise comparing the spatial positioning data and/or the scene data to context templates that may comprise features that match the physical objects detected in the physical environment and/or one or more states of the user within the physical environment. Further, the one or more machine learning models may generate millions of candidate contexts which are then assigned priority values based on their similarity to the scene data and/or spatial positioning data. The prioritized context may be selected from the plurality of candidate contexts based on the priority values such that the prioritized context is the candidate context with the highest priority value. A highest priority value may be positively correlated with the relevance of the corresponding candidate context to the physical environment and/or state of a user within the physical environment.

The one or more machine learning models may be configured to recognize physical objects within the physical environment. For example, the one or more machine learning models may recognize signage that indicates the types of buildings in a physical environment (e.g., a sign with the word "BANK" on it). Further, the one or more machine learning models may recognize different types of physical objects in an environment (e.g., a bank building may be recognized based on the shape of the building). The physical objects that are recognized by the one or more machine learning models may be used to determine the prioritized context. For example, if a user is in an environment with signage for a bank, an automated teller machine (ATM), and a layout that is similar to a bank's layout, the prioritized context may be associated with a bank. Further, if a user is in a bank the prioritized context may indicate the location of the ATM and/or whether the ATM is operating normally (e.g., the ATM has cash available).

The scene data may indicate different sets of physical objects that are significant within a physical environment. For example, the scene data may indicate that a bank building and a traffic light are significant objects within a physical environment. Further, the scene data may indicate that a tree or a bird are objects within the same physical environment as the bank building and the traffic light are less significant than the bank building and/or traffic light. The scene data may comprise one or more images of the physical environment. For example, the scene data may comprise two-dimensional (e.g., images from a visible light camera) and/or three-dimensional images (e.g., images based on one or more LiDAR devices) of a physical environment. Objects in the one or more images may be recognized and used to determine the prioritized context. For example, an image comprising a grand piano and hundreds of seats may be used to determine a prioritized context that is associated with a concert hall. Further, the scene data may comprise audio based on sounds detected in the environment by the one or more sensors. The scene data may comprise a recording of background sounds in the physical environment that may be recognized and used to determine the prioritized context. For example, a physical environment in which the sounds of subway cars and subway arrival and departure times is detected may be used to determine a prioritized context that is associated with a subway station.

The spatial positioning data may comprise an indication of one or more states of a user in the physical environment. For example, the spatial positioning data may indicate a direction a spatial computing device is facing, a height of the spatial computing device with respect to the ground beneath the spatial computing device The spatial positioning data may indicate a direction in which a user of the spatial computing device is looking and/or a body position of the user. The spatial positioning data may be based on sensor outputs from eye tracking sensors that may be used to determine an object that a user of the spatial computing device is looking at and/or how long the user looks at the object. For example, the spatial positioning data may indicate that a user is looking at a bus stop and may generate a prioritized context that is associated with bus stops (e.g., a bus stop context that comprises indications of bus schedules and/or the arrival time of the next bus at a particular bus stop).

The spatial positioning data may comprise geo-coordinates that indicate a geographic location of the spatial computing device. For example, the spatial positioning data may comprise a longitude, latitude, and/or altitude of the spatial computing device. Further, one or more locations of one or more spatial anchors may be based on the geo-coordinates. For example, the one or more spatial anchors that are used to determine the position of virtual objects relative to a physical environment may use geo-coordinates that indicate the location of the spatial computing device to determine a position of the virtual objects relative to the spatial computing device.

The scene data and/or spatial positioning data may be homomorphically encrypted. For example, the computing system may be configured to process (e.g., recognize objects within the spatial positioning data) the spatial positioning data that has been homomorphically encrypted without decrypting the homomorphically encrypted spatial positioning data.

The one or more machine learning models may be implemented on a quantum computing device (e.g., a quantum photonic computing device) that may be configured to generate the plurality of candidate contexts. The quantum computing device may be configured to generate highly entangled quantum states based on input comprising a plurality of quantum bits (qubits) corresponding to scene data and/or spatial positioning data. The quantum computing device may be configured to generate the plurality of candidate contexts and/or a prioritized context based on the highly entangled quantum states. The use of qubits may allow the quantum computing device to represent a greater number of candidate contexts than the same number of bits of a non-quantum computing device. For example, eight bits of a non-quantum computing device may represent a single number from 0-255. In comparison, eight qubits may store all of the numbers between 0 and 255. As a result, for certain types of operations a quantum computing device may provide significantly greater performance than a non-quantum computing device.

At step 610, the computing system may determine whether a prioritized context of the plurality of candidate contexts meets one or more user criteria. For example, the context computing platform 102 may analyze the plurality of candidate contexts to determine whether a prioritized context meets one or more user criteria that determine whether one or more indications associated with the prioritized context may be generated.

Determining whether a prioritized context meets one or more user criteria may comprise determining an amount of computational resources that are required to generate the one or more indications. For example, the context computing platform 102 may generate an estimate of the amount of computational resources (e.g., CPU resources, GPU resources, and/or memory resources) that may be required to generate an indication comprising a virtual arrow in a virtual environment based on the physical environment. Further, based on the amount of computational resources exceeding a resource threshold, the prioritized context may be determined to meet the one or more user criteria. For example, the context computing platform 102 may determine that the available computational resources to generate the virtual arrow exceed the resource threshold that is based on the amount of computational resources required to generate the virtual arrow. If the context computing platform 102 determined that the computational resources were not available, then the prioritized context would not meet the one or more user criteria.

In some implementations, the resource threshold may be based on an amount of battery power that is estimated to be drained if the one or more indications are generated. For example, the resource threshold may be based on a portion of the battery power that may be drained by generating the one or more indications. For example, if generating the one or more indications is estimated to drain one tenth of one percent of the battery power, the computational resources may exceed the resource threshold.

Determining whether a prioritized context meets one or more user criteria may comprise determining whether the prioritized context meets one or more privacy criteria. For example, the context computing platform may determine whether the prioritized context indicates confidential information that a user of the spatial computing device is not authorized to view or hear (e.g., the home addresses and/or telephone numbers of people in the physical environment that have not authorized the dissemination of their addresses and/or telephone numbers). Further, the context computing platform may determine whether the prioritized context indicates confidential information about a user of the spatial computing device that should not be processed by the context computing platform 102 (e.g., a bank account number of a user of the spatial computing device). Meeting the one or more privacy criteria may comprise the prioritized context not indicating confidential information with respect to the physical objects in the physical environment. The confidential information may comprise confidential financial information, confidential health information, and/or confidential employment information. For example, if the prioritized context comprises the home address of a person that is not known to the user of the spatial computing device then the selected context may be determined not to meet the one or more user criteria. Further, based on the prioritized context meeting the one or more privacy criteria, the prioritized context may be determined to meet the one or more user criteria (e.g., no confidential information is indicated in the prioritized context).

At step 615, the computing system may, based on a prioritized context of the plurality of candidate contexts meeting the one or more user criteria, perform step 620. For example, a computing system (e.g., the context computing platform 102) may determine that a prioritized context of the plurality of candidate contexts meets the one or more user criteria based on the prioritized context meeting one or more privacy criteria and/or computational resource criteria. For example, determining whether the one or more criteria have been met may comprise determining whether the computational resources associated with generating one or more indications associated with the prioritized context exceed a resource threshold. Based on the computational resources exceeding the resource threshold, the computing system may perform step 620 and generate one or more spatial anchors.

Based on a prioritized context of the plurality of candidate contexts not meeting the one or more user criteria, the computing system may perform step 605. For example, a computing system (e.g., the context computing platform 102) may determine that a prioritized context of the plurality of candidate contexts does not meet the one or more user criteria based on the prioritized context not meeting one or more privacy criteria and/or computational resource criteria. For example, determining whether the one or more criteria have not been met may comprise determining whether the computational resources associated with generating one or more indications associated with the prioritized context exceed a resource threshold. Based on the computational resources not exceeding the resource threshold, the computing system may perform step 605 and generate a different prioritized context. For example, the computing system may determine that the candidate context corresponding to the next highest priority value may become the prioritized context.

At step 620, a computing system may generate one or more spatial anchors at which to position one or more indications of the prioritized context within a virtual environment (e.g., a virtual environment based on the physical environment detected by one or more sensors of the spatial computing device). The one or more spatial anchors may correspond to a physical location within the physical environment. For example, the one or more spatial anchors may be associated with the location of stationary object (e.g., a desk in an office), a set of geo-coordinates (e.g., a longitude, latitude, and/or altitude), or a current location of a moving object (e.g., a moving train). For example, the context computing platform 102 may generate spatial anchors that are used to indicate the location of a virtual arrow that indicates the direction of nearby bank to which a user is being directed. Further, the one or more spatial anchors may be associated with a location that is relative to the location of a spatial computing device. For example, one or more spatial anchors may be associated with a location that is one meter directly in front of a portion of the spatial computing device (e.g., forward facing cameras of a spatial computing device that are oriented in the same direction as the viewing direction of a user of the spatial computing device).

At step 625, a computing system may generate a virtual environment comprising the one or more indications of the prioritized context positioned at the one or more spatial anchors. The virtual environment may be superimposed over one or more images of the physical environment. For example, the one or more indications may highlight one or more portions of images of the physical environment. Further, the virtual environment may comprise virtual objects (e.g., arrows, lines, geometric figures, user interface elements, and/or virtual representations of real-world objects) that may be generated within the one or more images. Further, the one or more indications may comprise one or more audio indications may be configured to sound as if the one or more audio indications originate from a particular location. For example, the one or more spatial anchors may be used to generate one or more audio indications that sound as if the one or more audio indications are emanating from a particular direction (e.g., a left side or right side of the spatial computing device).

The one or more indications of the prioritized context may comprise at least one virtual object that is anchored to at least one of the physical objects in the physical environment. For example, the context computing platform 102 may generate one or more indications comprising information about the hours of operation of a nearby bank. Further, the information about the bank may be anchored to a point on the ground in the physical environment that appears one meter in front of a user of the spatial computing device.

Based on the prioritized context comprising a navigational context, the one or more indications may comprise an indication of a current location or one or more directional indications to a location within the physical environment. For example, the context computing platform 102 may generate one or more indications comprising a virtual arrow that points in the direction of a nearby bank. The virtual arrow may be anchored to a point on the ground in the physical environment that appears three meters in front of a user of the spatial computing device.

Based on the prioritized context comprising an informational context, the one or more indications may comprise a description of at least one of the physical objects that was recognized. For example, the context computing platform 102 may generate one or more indications comprising a description of the services available at a nearby bank. The one or more indications may comprise text that is anchored to a point on the ground in the physical environment that appears half a meter in front of a user of the spatial computing device.

Based on the prioritized context comprising a personal context, the one or more indications may comprise one or more virtual objects that were configured by a user of the spatial computing device. Further, the one or more virtual objects may comprise a virtual desktop, a virtual office, and/or a virtual user interface. For example, the context computing platform 102 may generate one or more indications comprising a virtual desktop for a user in an office environment. Further, the one or more indications may comprise a virtual display device that is anchored to a desk in the physical environment (e.g., an office) in which the user of a spatial computing device works. The virtual display device may appear like a physical display device and may receive inputs based on gestures of the user that are detected by the spatial computing device.

The virtual environment may comprise a virtual representation of the physical environment in which the spatial computing device is present. For example, the virtual environment may comprise a three-dimensional visual representation of a bank. The virtual representation of the physical environment may be interacted with in a manner similar to that of an actual physical environment. Further, the virtual representation of the physical environment may be configured to respond to virtual inputs in a way that is similar to the way an actual physical environment would respond to physical inputs. For example, the spatial computing device may detect the positions of a user's hands and use the positions of the user's hands to generate one or more virtual inputs that may be used to select an option from a virtual interface. In some implementations, the virtual representation may generate one or more sounds including sounds based on one or more virtual inputs directed to the virtual representation of the physical environment. For example, the virtual representation may generate a chiming sound when a user arrives at a destination or looks at a significant object (e.g., an entrance to a bank) in the physical environment. In some embodiments, the computing system may perform step 605 after completing step 630.

Figure 7:
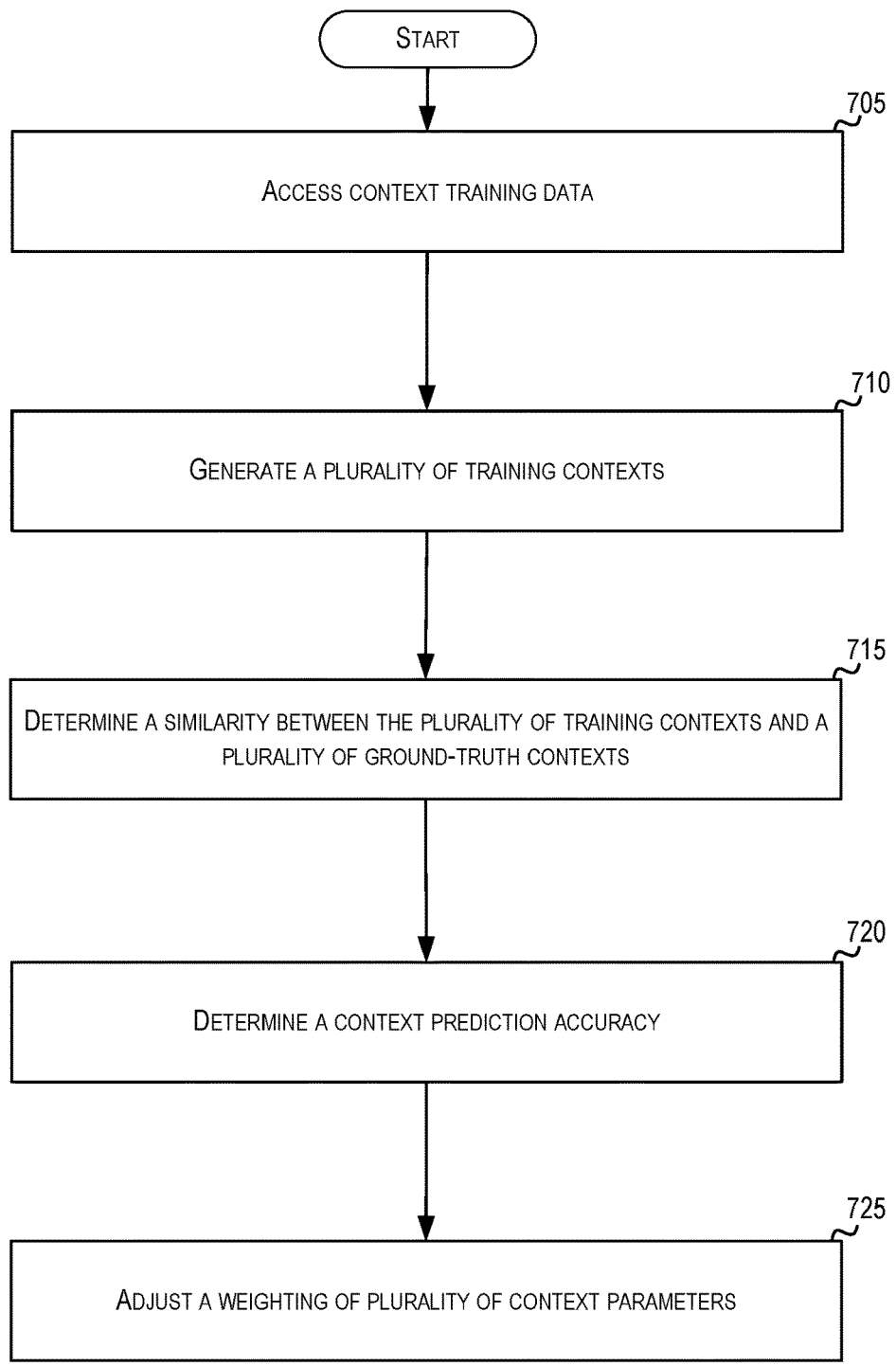
FIG. 7 depicts an illustrative method for automatically training one or more machine learning models to automatically prioritize and orchestrate spatial data in accordance with one or more aspects of the disclosure.

FIG. 7 depicts an illustrative method for automatically training one or more machine learning models to automatically prioritize and orchestrate spatial data in accordance with one or more aspects of the disclosure. The steps of a method 700 for automatically training one or more machine learning models to automatically prioritize and orchestrate spatial data may be implemented by a computing device or computing system (e.g., the context computing platform 102) in accordance with the computing devices and/or computing systems described herein. One or more of the steps described with respect to FIG. 7 may be omitted, performed in a different order, and/or modified. Further, one or more other steps (e.g., the steps described with respect to FIG. 6) may be added to the steps described with respect to FIG. 7.

At step 705, a computing system may access context training data. The context training data may comprise historical scene data and/or historical spatial positioning data. The historical scene data and/or historical spatial positioning data may be based on real-work scene data and/or spatial positioning data that was previously captured with the consent of the user of a spatial computing device in a secure and/or privacy enhancing manner. The historical scene data may be similar to the scene data described herein. The historical spatial positioning data may be similar to the spatial positioning data described herein. The context training data may be stored in a storage device of the machine learning model training system 108 and may be used by the machine learning model training system 108 in order to train and/or retrain one or more machine learning models.

At step 710, a computing system may generate a plurality of training contexts. Generating the plurality of training contexts may be based on inputting the context training data into the one or more machine learning models (e.g., the one or more machine learning models described herein). The one or more machine learning models may comprise the features and/or capabilities of machine learning models described herein including the one or more machine learning models described with respect to FIG. 4. For example, context training data may be inputted into one or more machine learning models that may be implemented on the machine learning model training system 108. The one or more machine learning models of the machine learning model training system 108 may be configured and/or trained to receive the context training data and perform one or more operations including analyzing the historical scene data and/or historical spatial positioning data. Further, the one or more machine learning models may generate a plurality of training contexts. For example, the plurality of training contexts may comprise different contexts based on historical scene data based on detection of different physical environments and/or historical spatial positioning data based on detection of different states of a user.

At step 715, a computing system may determine similarities between the plurality of training contexts and a plurality of ground-truth contexts. Determination of the similarities between the plurality of training contexts and the plurality of ground-truth contexts may be based on one or more comparisons of the plurality of training contexts to the plurality of ground-truth contexts. For example, the machine learning model training system 108 may compare the type, number, associated content, and/or position of one or more indications that may be generated based on the plurality of training contexts to one or more indications that may be generated based on the plurality of ground-truth contexts.

At step 720, a computing system may generate, based on the similarity between the plurality of training contexts and the plurality of ground-truth contexts, a context prediction accuracy of the one or more machine learning models. Generation of the context prediction accuracy may be based on an extent to which the plurality of training contexts are similar to the plurality of ground-truth contexts.

For example, if the plurality of training contexts and the plurality of ground-truth contexts are similar (e.g., the type, number, associated content, and/or position of one or more indications that may be generated based on the plurality of training contexts match or are within a predetermined degree of similarity of the corresponding type, number, associated content, and/or position of one or more indications that may be generated based on the ground-truth contexts) then the similarity may be determined to be high. If the plurality of training contexts are dissimilar (e.g., the type, number, associated content, and/or position of one or more indications that may be generated based on the plurality of training contexts not matching or are not being within a predetermined degree of similarity of the corresponding type, number, associated content, and/or position of one or more indications that may be generated based on the ground-truth contexts) from the plurality of ground-truth contexts the similarity may be determined to be low.

The context prediction accuracy may be positively correlated with the similarity between the plurality of training contexts and the ground-truth contexts. Further, the context prediction accuracy may be based on a number of similarities between the plurality of training contexts and the ground-truth contexts. A greater number of similarities between the plurality of training contexts and the ground-truth contexts may be positively correlated with a higher context prediction accuracy. A confidence value or other value may be generated to indicate the context prediction accuracy. For example, a numerical confidence value between zero and one hundred may be generated. The confidence value may be positively correlated with the training contexts accuracy and greater similarities between the plurality of training contexts and the plurality of ground-truth contexts may be positively correlated with a higher confidence value.

At step 725, a computing system may adjust a weighting of a plurality of context parameters of the one or more machine learning models based on the context prediction accuracy. For example, the machine learning model training system 108 may increase the weight of the plurality of context parameters that were determined to increase the context prediction accuracy and/or decrease the weight of the plurality of context parameters that were determined to decrease the context prediction accuracy. Further, some of the plurality of context parameters may be more heavily weighted than other context parameters. The weighting of the plurality of context parameters may be positively correlated with the extent to which the plurality of context parameters contribute to increasing the context prediction accuracy. For example, indication type parameters may be weighted more heavily than indication position parameters.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing system for generating and orchestrating spatial computing data, the computing system comprising:

a spatial computing device configured to:
  generate a virtual environment based on one or more sensors that generate scene data based on one or more states of a physical environment, wherein the scene data comprises one or more images of the physical environment; and
  generate spatial positioning data comprising an indication of one or more states of a user in the physical environment;
a quantum computing device configured to implement one or more machine learning models that recognize physical objects within the physical environment and generates a plurality of candidate contexts that indicate different sets of the physical objects that are significant within the physical environment;
one or more processors; and
memory storing computer-readable instructions that, when executed by the one or more processors, cause the computing system to:
  generate, based on inputting the scene data and the spatial positioning data into the one or more machine learning models, a prioritized context of the plurality of candidate contexts;
  determine whether a prioritized context of the plurality of candidate contexts meets one or more user criteria;
  based on the prioritized context meeting the one or more user criteria, generate one or more spatial anchors at which to position one or more indications of the prioritized context within the virtual environment; and
  generate the virtual environment comprising the one or more indications of the prioritized context positioned at the one or more spatial anchors.

2. The computing system of claim 1, wherein the quantum computing device comprises a plurality of quantum gates and is configured to generate quantum bits (qubits) based on highly entangled photons, and wherein the quantum computing device is further configured to generate the plurality of candidate contexts based on passing the qubits through the plurality of quantum gates and detecting output of the plurality of quantum gates.

3. The computing system of claim 1, wherein the memory stores additional computer-readable instructions to generate the prioritized context of the plurality of candidate contexts, that when executed by the one or more processors, further cause the computing system to:
  generate a plurality of priority values based on the different sets of the physical objects within the physical environment; and
  determine that the prioritized context is the candidate context corresponding to the priority value that is highest.

4. The computing system of claim 1, wherein the spatial positioning data is homomorphically encrypted, and wherein the computing system is configured to process the spatial positioning data that has been homomorphically encrypted.

5. The computing system of claim 1, wherein the spatial positioning data comprises geo-coordinates that indicate a geographic location of the spatial computing device, and wherein one or more locations of the one or more spatial anchors are based on the geo-coordinates.

6. The computing system of claim 1, wherein the one or more indications of the prioritized context comprise at least one virtual object that is anchored to at least one of the physical objects.

7. The computing system of claim 1, wherein the prioritized context comprises a navigational context, and wherein the one or more indications comprise an indication of a current location or one or more directional indications to a location within the physical environment.

8. The computing system of claim 1, wherein the prioritized context comprises an informational context, and wherein the one or more indications comprise a description of at least one of the physical objects that was recognized.

9. The computing system of claim 1, wherein the prioritized context comprises a personal context, wherein the one or more indications comprise one or more virtual objects that were configured by a user of the spatial computing device, and wherein the one or more virtual objects comprise a virtual desktop, a virtual office, or a virtual user interface.

10. The computing system of claim 1, wherein the memory stores additional computer-readable instructions to determine whether a prioritized context of the plurality of candidate contexts meets one or more user criteria, that when executed by the one or more processors, further cause the computing system to:
  determine an amount of computational resources that are required to generate the one or more indications; and
  based on the amount of computational resources exceeding a resource threshold, determine that the prioritized context meets the one or more user criteria.

11. The computing system of claim 1, wherein the memory stores additional computer-readable instructions to determine whether a prioritized context of the plurality of candidate contexts meets one or more user criteria, that when executed by the one or more processors, further cause the computing system to:
  determine whether the prioritized context meets one or more privacy criteria; and
  based on the prioritized context meeting the one or more privacy criteria, determine that the prioritized context meets the one or more user criteria.

12. The computing system of claim 11, wherein the meeting the one or more privacy criteria comprises the prioritized context not indicating confidential information with respect to the physical objects in the physical environment, and wherein the confidential information comprises confidential financial information, confidential health information, or confidential employment information.

13. The computing system of claim 1, wherein the memory stores additional computer-readable instructions that, when executed by the one or more processors, further cause the computing system to:
  access context training data comprising historical scene data and historical spatial positioning data;
  generate, based on inputting the context training data into the one or more machine learning models, a plurality of training contexts;
  determine a similarity between the plurality of training contexts and a plurality of ground-truth contexts;
  generate, based on the similarity between the plurality of training contexts and the plurality of ground-truth contexts, a context prediction accuracy of the one or more machine learning models; and
  modify a weighting of a plurality of context parameters of the one or more machine learning models based on the context prediction accuracy, wherein the weighting of the plurality of context parameters that increase the context accuracy is increased, and wherein the weighting of the plurality of context parameters that decrease the context accuracy is decreased.

14. The computing system of claim 1, wherein the scene data comprises audio based on sounds detected in the environment by the one or more sensors.

15. The computing system of claim 1, wherein the spatial positioning data indicates a direction in which a user of the spatial computing device is looking or a body position of the user.

16. A method of generating and orchestrating spatial data, the method comprising:
   generating, by a quantum computing device comprising one or more processors, based on inputting scene data and spatial positioning data into one or more machine learning models, a prioritized context of a plurality of candidate contexts that indicate different sets of physical objects that are significant within a physical environment, wherein the scene data comprises one or more images of the physical environment, wherein the spatial positioning data comprises an indication of one or more states of a user in the physical environment, and wherein the one or more machine learning models are configured to recognize the physical objects within the physical environment;
   determining, by the computing device, whether a prioritized context of the plurality of candidate contexts meets one or more user criteria;
   based on the prioritized context meeting the one or more user criteria, generating, by the computing device, one or more spatial anchors at which to position one or more indications of the prioritized context within a virtual environment; and
   generating, by the computing device, the virtual environment comprising the one or more indications of the prioritized context positioned at the one or more spatial anchors.

17. The method of claim 16, wherein the computing device comprises a plurality of quantum gates and is configured to generate quantum bits (qubits) based on highly entangled photons, and wherein the quantum computing device is further configured to generate the plurality of candidate contexts based on passing the qubits through the plurality of quantum gates and detecting output of the plurality of quantum gates.

18. The method of claim 16, further comprising:
   generating, by the computing device, a plurality of priority values based on the different sets of the physical objects within the physical environment; and
   determining, by the computing device, that the prioritized context is the candidate context corresponding to the priority value that is highest.

19. The method of claim 16, wherein the spatial positioning data is homomorphically encrypted, and wherein the computing device is configured to process the spatial positioning data that has been homomorphically encrypted.

20. One or more non-transitory computer readable media comprising instructions that, when executed by a computing platform comprising at least one processor, a communication interface, and memory, cause the computing platform to:
   generate, based on inputting scene data and spatial positioning data into one or more machine learning models, a prioritized context of a plurality of candidate contexts that indicate different sets of physical objects that are significant within a physical environment, wherein the scene data comprises one or more images of the physical environment, wherein the spatial positioning data comprises an indication of one or more states of a user in the physical environment, and wherein the one or more machine learning models are configured to recognize the physical objects within the physical environment;
   determine whether a prioritized context of the plurality of candidate contexts meets one or more user criteria;
   based on the prioritized context meeting the one or more user criteria, generate one or more spatial anchors at which to position one or more indications of the prioritized context within a virtual environment; and
   generate the virtual environment comprising the one or more indications of the prioritized context positioned at the one or more spatial anchors.

\* \* \* \* \*